(No Model.)
C. REISER.
SAWMILL FEED.
No. 523,239.  Patented July 17, 1894.
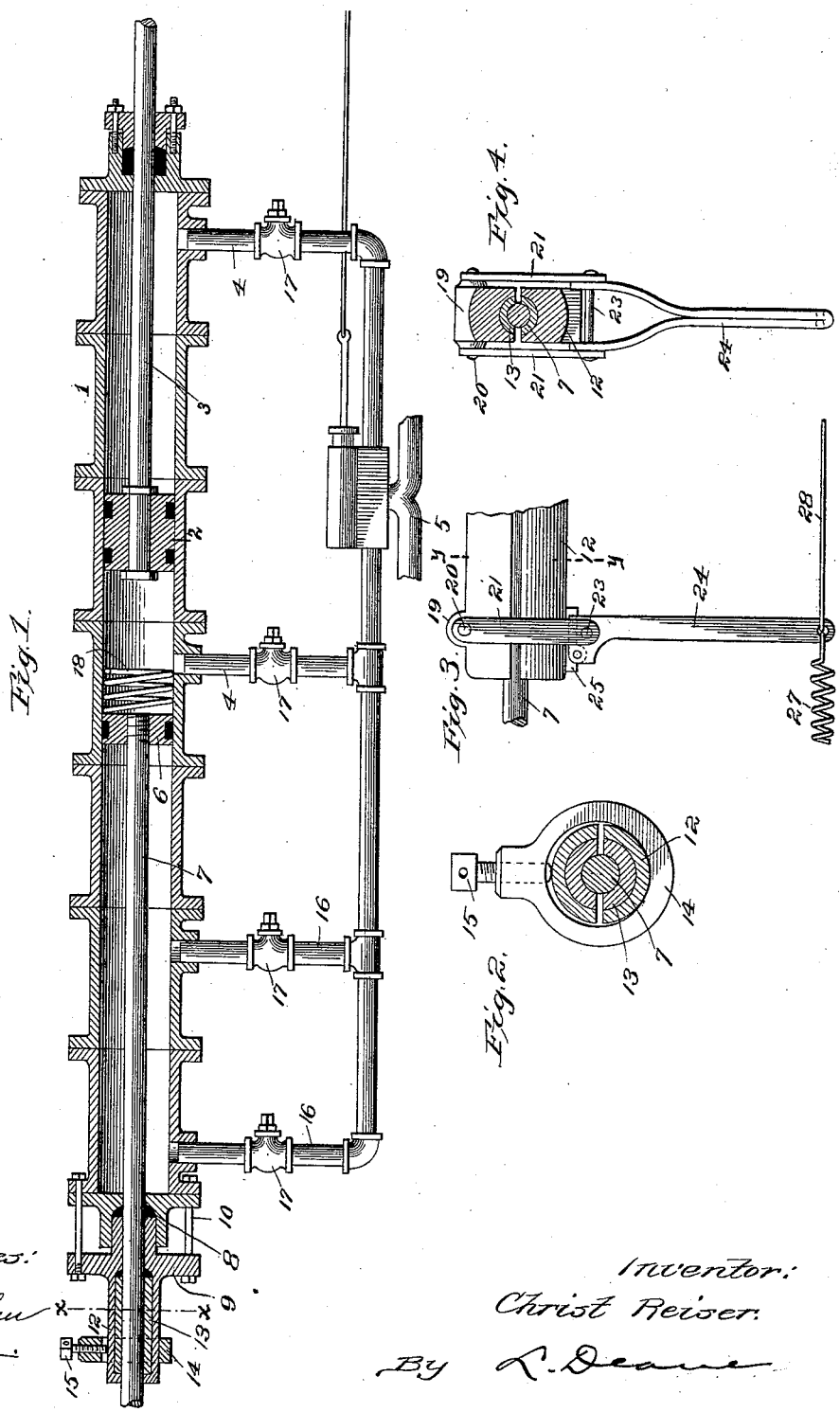
Witnesses:
H. S. John
W. Deane
Inventor:
Christ Reiser.
By L. Deane
His Atty.

UNITED STATES PATENT OFFICE.

CHRIST REISER, OF WESTLAKE, LOUISIANA.

SAWMILL-FEED.

SPECIFICATION forming part of Letters Patent No. 523,239, dated July 17, 1894.

Application filed February 21, 1894. Serial No. 501,038. (No model.)

*To all whom it may concern:*

Be it known that I, CHRIST REISER, a citizen of the United States, residing at Westlake, in the parish of Calcasieu and State of Louisiana, have invented certain new and useful Improvements in Sawmill-Feeds; and I do hereby declare the following to be a full, clear, and exact description of the invention, such as will enable others skilled in the art to which it appertains to make and use the same.

My invention relates to improvements in that class or description of circular saw mills, known as steam shot gun feed, in which the log carriage after having been fed forward to the saw, is returned to normal position by a sudden movement, through the medium of the steam actuated piston connected therewith.

The object of my invention is to provide an improved bumper for checking the recoil of the piston and taking up the shock or jar caused by movement thereof; and also to provide improved means for adjusting the bumper so as to cut off the stroke of the piston at varying points according as a long or short log is being sawed.

The invention consists in the novel construction and combination of parts hereinafter fully described and claimed.

In the accompanying drawings, Figure 1, is a longitudinal sectional view of so much of a saw mill as is necessary to illustrate my invention. Fig. 2, is a cross section of the gripping jaws, taken on the line $x$—$x$ Fig. 1. Fig. 3, is a detail elevation of a modified construction of the gripping jaws. Fig. 4, is a cross section of the same on the line $y$—$y$, Fig. 3.

In the said drawings, the reference numeral 1, designates an elongated steam cylinder, on which is located a piston 2, provided with a rod 3, which may be connected with the reciprocating log carriage in any suitable manner. As said carriage however, forms no part of the present invention, illustration or description thereof is not necessary.

The numerals 4, 4, designate steam pipes, connected with one end of the cylinder, on opposite sides of the piston, and is also connected with a steam supply pipe 5, leading from a generator or other source of supply. Also located in cylinder 1, is a bumper or piston head 6, provided with a rod 7, which passes through a stuffing box 8, secured to the cylinder.

The numeral 9, designates a gland connected with the stuffing box by means of bolts 10, and provided with the outwardly extending semi-circular gripping jaws 12, provided with a lining 13, of brass or Babbitt metal. These jaws embrace the bumper rod 7, and are encircled by a collar 14, provided with a screw threaded aperture to receive a set screw 15, the inner end of which engages with one of said gripping jaws.

The end of the cylinder opposite the main or working piston is provided with one or more steam pipes 16, connected with supply pipe 5, and provided with valves 17, and located between the bumper and piston is a coiled spring 18.

The operation is as follows: When commencing work, the set screw 15, is loosened releasing the gripping jaws so that the rod 7, can slide back or forth therein. The bumper is now adjusted to or from the piston according to the length of log to be sawed by admitting steam thereto through one of the pipes 16. The screw is then tightened so as to cause the jaws to grip rod 7, when the machine may be started. On the return stroke of the piston it will strike the spring 18, thereby preventing jar or shock from the quiet movement of the piston.

By my invention the bumper can be quickly adjusted to permit of a long or short stroke of the piston, thereby effecting a saving in steam and also enabling a larger amount of work to be done in a given time.

In Figs. 3 and 4, I have shown a modified construction of the means for clamping the gripping jaws. In this case the collar 14, is dispensed with and the upper jaw formed with a lug 19, provided with a rod 20, to which is secured at each end, a downwardly depending plate or bar 21. At the lower ends of these plates is a transverse rod or shaft 23, which passes therethrough, on which is pivoted a cam lever 24, provided with a friction roller 25, adapted to bear against a lug 26, secured to the lower gripping jaw. To the lower end of this lever is secured coiled spring 27, the other end of which is to be secured to some stationary part of the machine. From this it will be seen that the tendency of the spring is to draw the lower end of the lever outward forcing the roller 25, against the lug 26, and by means of the connecting plates 21, forcing the gripping jaws toward each other and clamping the piston therebetween. By pulling the lever in the opposite direction the gripping jaws will expand and the piston be released. By means of a rod 28, connected with the lower end of the lever, and leading to the post of duty of the engineer the lever can be operated and the piston adjusted without the necessity of the engineer leaving his post. After adjusting the piston which can be effected by the steam pipe and sawyer's valve the operator releases the rod 28, when the spring 27, will again cause the piston to be clamped by the gripping jaws.

Having thus fully described my invention, what I claim is—

1. In a saw mill of the character described the combination with the cylinder, the supply pipes, the piston and its rod, of the bumper located in said cylinder, the coiled spring interposed between said bumper and piston, the horizontally movable bumper rod, and the steam pipes connected with the cylinder at varying distances from the bumper end of the cylinder, substantially as described.

2. In a saw mill of the character described, the combination with the cylinder, the piston and the rod located therein, of the bumper and rod also located in said cylinder, the coiled spring interposed between said piston and bumper, the stuffing box through which said rod passes, the gland connected therewith, the semi-circular spring gripping jaws, the plates secured to the upper jaw, the cam lever pivoted to said plates and provided with a roller, the lug on the lower jaw with which said roller engages and the coiled spring secured to the lower end of said lever, substantially as described.

In testimony whereof I affix my signature in presence of two witnesses.

CHRIST REISER.

Witnesses:
WM. W. COOPER,
S. ARTHUR KNAPP.